US008006032B2

(12) United States Patent
Askar et al.

(10) Patent No.: US 8,006,032 B2
(45) Date of Patent: Aug. 23, 2011

(54) OPTIMAL SOLUTION TO CONTROL DATA CHANNELS

(75) Inventors: Tahsin Askar, Round Rock, TX (US); Philip E. Madrid, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 856 days.

(21) Appl. No.: 11/843,434

(22) Filed: Aug. 22, 2007

(65) Prior Publication Data

US 2009/0055572 A1    Feb. 26, 2009

(51) Int. Cl.
*G06F 12/00* (2006.01)
(52) U.S. Cl. .......... 711/105; 711/111
(58) Field of Classification Search .......... 711/105, 711/111
See application file for complete search history.

(56) References Cited

U.S. PATENT DOCUMENTS

| | | | |
|---|---|---|---|
| 5,703,813 A | 12/1997 | Manning | |
| 5,828,856 A | 10/1998 | Bowes | |
| 5,998,829 A | 12/1999 | Choi | |
| 6,026,466 A | 2/2000 | Su | |
| 6,055,615 A | 4/2000 | Okajima | |
| 6,108,745 A | 8/2000 | Gupta | |
| 6,445,638 B1 | 9/2002 | Hsu | |
| 6,452,834 B1 | 9/2002 | Kengeri | |
| 6,545,935 B1 | 4/2003 | Hsu | |
| 6,816,889 B1 | 11/2004 | Graham | |
| 6,999,091 B2 | 2/2006 | Saxena | |
| 7,091,543 B2 | 8/2006 | Tzeng | |
| 7,110,306 B2 | 9/2006 | Parris | |
| 2005/0033909 A1* | 2/2005 | Chang et al. | 711/105 |
| 2005/0289317 A1 | 12/2005 | Liou | |
| 2006/0294264 A1 | 12/2006 | Akiyama | |

OTHER PUBLICATIONS

Infineon Technologies North America Corporation and Kingston Technology COmpany, Inc.: "Intel Dual-Channel DDR Memory Architecture White Paper" [Online] Sep. 2003, XP002505798; http://www.kingston.com/newtech/MKF_520DDRWhitepaper.pdf.
International Search Report in application No. PCT/US2008/009101 mailed Jul. 28, 2008.
Translation of Official Communication in German application No. 11 2008 002 273.9 issued on Oct. 13, 2010.

* cited by examiner

*Primary Examiner* — Yong Choe
(74) *Attorney, Agent, or Firm* — Meyertons, Hood, Kivlin, Kowert & Goetzel, P.C.

(57) ABSTRACT

A dynamic random access memory (DRAM) controller may comprise two sub-controllers, each capable of handling a respective N-bit interface (e.g. 64-bit interface). Each sub-controller may also be configurable to be (2*N)-bit (e.g. 128-bit) capable with respect to control logic, for controlling a logical 128-bit data path. In ganged mode, each sub-controller may logically operate as if it were handling data in 128-bit chunks, (i.e. handling the entire 128-bit data path), while actual full bandwidth may be achieved by having one of the sub-controllers operate on commands and a first N-bit portion of each (2*N)-bit chunk of data, and having the other sub-controller operate on a "copy" of the commands with a corresponding remaining N-bit portion of each (2*N)-bit chunk of data. Once the basic input/output system (BIOS) has configured and initialized the two DRAM controllers to operate in ganged mode, the BIOS and all software may no longer need to be aware that two memory controllers are used to access a single (2*N)-bit wide channel.

21 Claims, 3 Drawing Sheets

OPTIMAL SOLUTION TO CONTROL DATA CHANNELS

BACKGROUND OF THE INVENTION

1. Field of the Invention

This invention relates generally to the field of memory systems, and more particularly, to controlling multiple memory channels.

2. Description of the Related Art

With present-day computer systems becoming increasingly more complex, and advances in technology leading to ever increasing processor speeds, it is becoming more and more difficult to optimize system performance, which oftentimes depends largely on the bandwidth and latency of the given system's memory. Consequently, accessing memory with the lowest latency, and highest use of memory bandwidth may improve and/or optimize the system's performance. As the required time to access the memory and complete a given memory request increases, the system slows down. Thus, any reduction in access time, and/or an overall increase in throughput on the memory bus may benefit system performance.

A large number of systems, including desktop computers, graphics adapter cards and notebook computers among others, use Dynamic random access memory (DRAM). DRAM devices provide many advantages over other memory technologies, including and most notably, static random access memory (SRAM) devices. The most important of these benefits are higher storage densities and less power consumption. However, these benefits come at the expense of various time delays incurred when preparing the memory cells and other components within DRAM devices for each subsequent access, for example before/after each read/write access. Examples of such delays include the time required to perform row precharge, row refresh, and row activation. In order to more precisely manage and control memory operations when incurring these delays, additional commands—which are transmitted between read/write accesses—have been created, resulting in additional overhead. In order to improve system performance and design by making memory management transparent to central processing units, memory access is typically managed by dedicated memory controllers, which control the flow of data to/from the memory and execute necessary memory management commands such as row precharge and row activate.

A large percentage of DRAMs in use today belong to the double-data-rate synchronous DRAM (DDR SDRAM) family. DDR SDRAM (including DDR2 and DDR3) achieves greater bandwidth than single-data-rate SDRAM by transferring data on the rising and falling edges of a strobe signal based on the system the clock. This effectively doubles the transfer rate, thereby improving system performance, without requiring an increase in the frequency of the memory bus. In addition to data transfer speed, the performance of a system will also be affected by the memory bus width. In general, the bus width is determined by how many parallel data lines are available to communicate with the memory cells. A memory controller's bus width will also determine how many bits of data the controller can manage at a time. This can range anywhere from 8 bits in earlier systems, to 256 bits in more complicated systems and graphics cards. To further increase DRAM performance, in this case by addressing the bus width, many motherboards are configured with dual-channel memory, doubling the data throughput between the DRAM and the memory controller by effectively doubling the bus width.

Dual-channel (or more generally multi-channel) technology was created to address mainly the issue of bottlenecks. As previously indicated, the configuration of a memory controller will typically determine the type and speed of DRAM that can be used, as well as the maximum size of each individual memory module, and overall memory capacity of the system. Memory controllers exist with a variety of built-in features and capabilities, but in the past they were typically configured to provide control for a single memory channel. Advantages of single-channel memory controllers include its low cost and flexibility. However, single-channel memory controllers may create a bottleneck when their performance is not sufficient to track the performance of the CPU. In many cases, the CPU may remain idle, absent of data to process if the memory controller is unable to maintain the required data flow. As a general rule, most single-channel memories experience this bottleneck effect when the CPU bus throughput exceeds the bus throughput of the single memory channel.

A dual-channel configuration typically alleviates this bottleneck problem by effectively doubling the amount of available memory bandwidth. Instead of a single memory channel, a second parallel channel is added to reduce the bottleneck by operating two memory channels simultaneously. Thus, dual-channel architecture may make use of existing SDRAM (e.g. DDR) technology and improve the method(s) by which memory is accessed. To use dual-channel memory controllers, the DRAM devices are typically separated onto two different buses to allow two memory controllers to access them in parallel, thus doubling the theoretical amount of bandwidth of the bus. From a functional perspective, more channels could be built (a channel for every DRAM cell might prove to be an ideal solution), but due to wire count, line capacitance, and the need for identical lengths for parallel access lines, additional channels are generally very difficult to implement. Presently, higher end graphics subsystems may be implemented with four, 64-bit simultaneous memory controllers operating in parallel, to manage a total of 256 lines of data at a time. In some cases, memory controllers that support multiple channels may be designed to operate in "ganged mode", where, for example, two 64-bit memory controllers can be used to access a 128-bit memory device, or manage a single logical 128-bit interface.

Many computing architectures that require high reliability memory subsystems use redundant memory devices and an error correcting code, (ECC) to correct potential errors that might occur during operation. The ECC can oftentimes be configured with a multi-bit symbol to correct errors that result from an inoperative memory device. This configuration/use of ECC is often referred to as "chip kill ECC". Dual-channel configurations are relevant to chip kill ECC. In fact, chip kill ECC may be one reason why memory controllers that support multiple channels may be configured to operate in ganged mode, if the bandwidth required by the chip kill ECC was greater than the data path width of the memory devices. For example, support for x4 chip kill ECC would mean that any 4-bit symbol should be fixable, even if it is completely bad. The number of x4 symbols used by the chip kill ECC would determine the size of the required interface, i.e. the required width of the data path. For example, if 32×4 symbols were used, a 128-bit interface would be required.

While overall system performance can be substantially improved by providing support for dual-channel memory, the design complexity and size of memory controllers capable of handling dual-channel configurations become unavoidably greater than that of memory controllers which only provide support for a single channel, especially when dual-channel support is required in both "ganged" and "unganged" configurations. It is thus a challenge to design and build memory controllers capable of dual-channel memory control while remaining area efficient and not much more complex than memory controllers configured for handling only a single memory channel.

Other corresponding issues related to the prior art will become apparent to one skilled in the art after comparing such prior art with the present invention as described herein.

SUMMARY OF THE INVENTION

A system (e.g. a computer system) may include DRAM (Dynamic Random Access Memory) devices coupled to a DRAM bus, and a DRAM controller configured to manage and control access to the DRAM devices. In one set of embodiments, the DRAM controller may comprise two independent DRAM sub-controllers to control dual memory channels. In ganged mode, which may be required by chip kill ECC for example, the two independent DRAM sub-controllers may operate as a single (2*N)-bit (e.g. 128-bit) wide dual-channel memory controller, while in unganged mode, the two independent DRAM sub-controllers may operate as two single-channel N-bit (e.g. 64-bit) wide memory controllers.

In one set of embodiments, the two DRAM sub-controllers may be designed and implemented to be identical to each other, and each one may be configured to have a physical 64-bit interface to fundamentally handle a 64-bit data path. That is, the data path through each controller may comprise only 64-bits. Even though each DRAM sub-controller may only have access to a 64-bit interface, when operating in ganged mode each DRAM sub-controller may operate as if it had access to a 128-bit data path. That is, each DRAM sub-controller may behave logically as if it were handling data in 128-bit chunks. In one set of embodiments, each DRAM sub-controller may have a corresponding port (channel) used by the system for accessing memory. One of the ports (corresponding to one of the DRAM sub-controllers) may be configured as a single 128-bit DRAM controller. Subsequently, all traffic on the configured port may be replicated (e.g. by a configured North Bridge coupled to the DRAM sub-controllers) to the other port. Each DRAM sub-controller may thus be 128-bit capable with respect to control logic, while only accessing 64-bit actual data paths.

In one set of embodiments, transferring data within the system may comprise reading and writing cache lines, which may be of greater width than a memory bus, for example 64 bytes wide. Reading and/or writing cache lines using a 128-bit memory channel instead of a 64-bit memory channel reduces the size of burst transfers required to read and/or write data on a single cache line. Consequently, the size of burst transfers for a 128-bit wide memory channel would be half the size of burst transfers for a 64-bit wide memory channel. Each DRAM sub-controller may therefore adjust the number of beats (i.e. the size) for burst transfers in order to take into account that it now logically controls a 128-bit wide memory channel (while only physically controlling a 64-bit wide data path).

A system may include a first and a second memory controller, and a first and a second memory module. Each memory controller may have a respective physical N-bit data path, and each memory module may have N data lines (i.e. an N-bit data port), with the N-bit data path of the first memory controller coupled to the N-bit data path of the first memory module, and the N-bit data path of the second memory controller coupled to the N-bit data port of the second memory module. The system may be configured to use a logical memory channel having a (2*N)-bit wide data path, which may be accessed using the two separate memory controllers. Configuration information may be written to the two memory controllers, e.g. by the basic input/output system (BIOS), to configure the two memory controllers to operate in ganged mode, and a channel corresponding to one of the memory controllers may be designated as a (2*N)-bit wide logical memory channel. Subsequently, all accesses to the designated channel, and thus to its corresponding memory controller, may simultaneously be copied to the other memory controller. Each memory controller may therefore operate as if it were a (2*N)-bit controller, while actually accessing a respective N-bit data path.

The system may send memory requests to the designated memory controller to transmit and/or receive (2*N)-bit chunks of data through the (2*N)-bit wide memory channel. These memory requests may be replicated to the other memory controller, and in response to these requests, the first memory controller may transmit and/or receive a first N-bit portion of each of the (2*N)-bit chunks of data to and/or from the first memory module, and the second memory controller may transmit and/or receive the remaining N-bit portion of each of the (2*N)-bit chunks of data to and/or from the second memory module. The data may thus be provided to the system in (2*N)-bit chunks. The system may be further be configurable to operate in un-ganged mode, and use two logical memory channels, each being N-bit wide, with the two memory controllers individually controlling each memory channel using their own respective N-bit data paths. Respective memory requests may be sent to both memory controllers, or to each one of two respective ports configured for the memory controllers, to access data respectively through each given memory controller's N-bit data path.

BRIEF DESCRIPTION OF THE DRAWINGS

Other aspects of the invention will become apparent upon reading the following detailed description and upon reference to the accompanying drawings in which.

Figure 1:
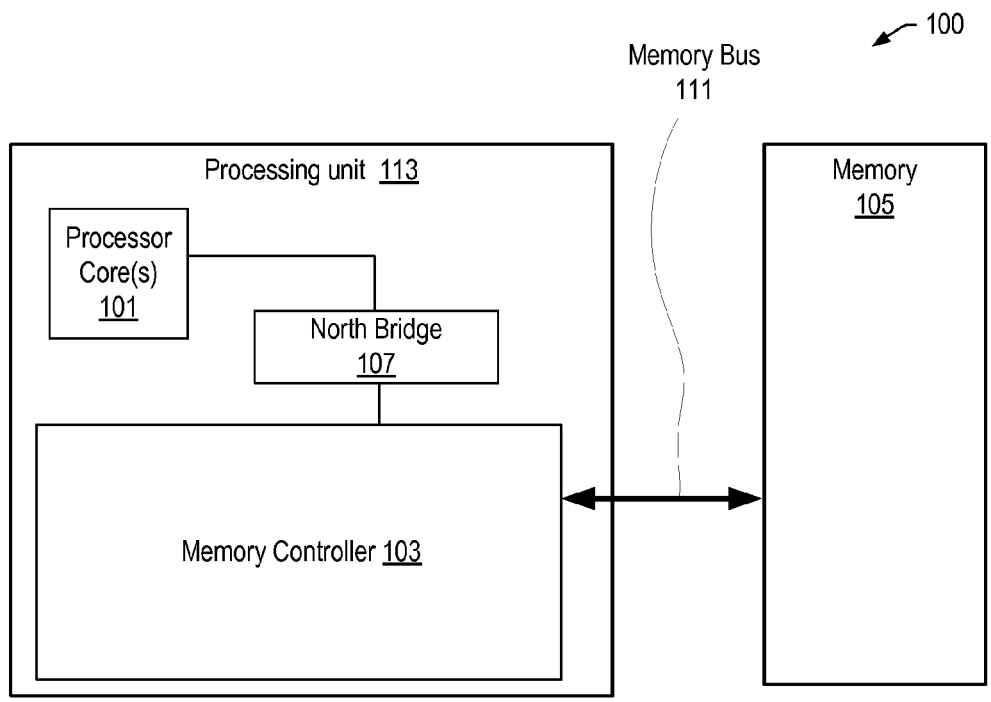
FIG. 1 a block diagram of an exemplary system comprising a memory controller configured to control access to a memory via a memory bus.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

FIG. 1 shows a block diagram of a basic exemplary system 100, which may be a computer system, in which a processing unit 101 is configured with a processor core 101, coupled to a memory controller 103. In some embodiments, processor core 101 nay be coupled to memory controller 103 through a North Bridge 107 configured to manage data flow to and from processor core 101. Memory controller 103 may be coupled to a memory bus 111, through which memory controller 103 may regulate access to memory 105 to facilitate data exchange between processing unit 100 and memory 105. Those skilled in the art will appreciate that system 100 may be implemented in a variety of ways, and is shown to illustrate a basic configuration in which memory access is controlled by a memory controller.

In one set of embodiments, memory controller 103 may comprise sub circuits and/or components, including registers for supporting a range of functionality as required by the needs of system 100. For example, memory controller 103 may include various buffers for buffering data being transferred between memory 105 and processor core 101, and may be divided into sub-control blocks. Similarly, memory 105 may include multiple memory elements or memory devices in various configurations, adapted to interface with memory controller 103 via memory bus 111. Various embodiments are possible and are contemplated. Memory 105 may be a DRAM (dynamic random access memory), and memory controller 103 may therefore be a DRAM controller. More specifically, system 100 may comprise a Double Data Rate DRAM (DDR DRAM), e.g. a DDR3 memory (memory 105), controlled by DDR3 memory controller 103. In one set of embodiments, DRAM controller 103 may be configured to manage and control access to DRAM devices 105 via more than one channel, e.g. via dual channels.

Both DRAM channels may be of a specified size, e.g. 64-bits wide. Thus, a single DRAM channel may be 64-bits wide. Two DRAM channels in parallel may therefore provide a 128-bit effective bus width. In some system configurations the two DRAM channels may preferably be "ganged" together to operate as a single logical 128-bit interface. In certain other system configurations the two DRAM channels may preferably by "unganged" to operate as two independent 64-bit channels. Accommodating both system configurations may require preserving the independence of the smaller, single channel [bus] width, which in the case of the above mentioned example would mean maintaining a 64-bit independence. It should be noted that while in the embodiments discussed herein a single channel has a bus width of 64 bits, in other embodiments a single channel may have a different bus width, and various embodiments and system configurations in which the bus width is lower or higher than 64 bits are possible and are contemplated.

Figure 2:
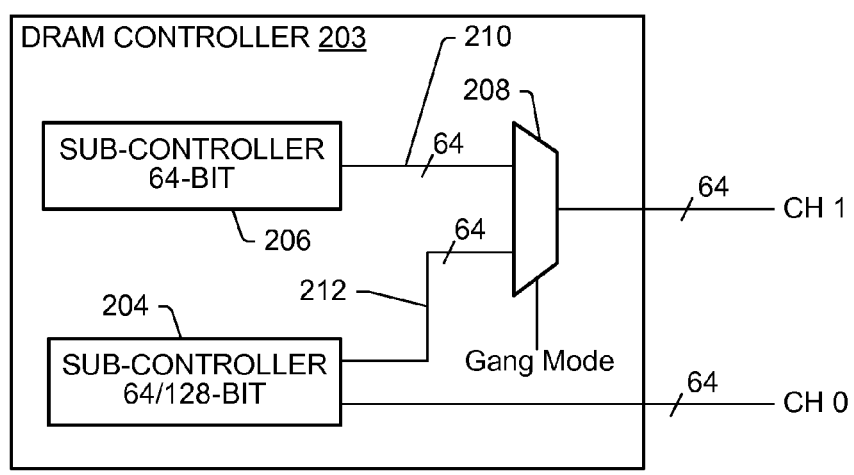
FIG. 2 is a partial logic block diagram of one embodiment of the memory controller of FIG. 1.

In one set of embodiments, DRAM 105 may comprise a plurality of physical DIMMs (dual inline memory modules). System 100 may be configured such that a logical DIMM accessed by DRAM controller 103 either comprises two identical physical 64-bit DIMMs operated in parallel to form a single 128-bit interface (as in ganged mode), or one physical 64-bit DIMM (as in unganged mode). In order to maintain independent 64-bit channels for preserving the ability to access two 64-bit wide logical DIMMs, DRAM controller 103 may be configured with two memory sub-controllers. As shown in FIG. 2, each memory sub-controller may be capable of controlling at least a respective single 64-bit wide channel in unganged mode, with one of them also capable of controlling a 128-bit channel. When the two memory sub-controllers are operated in ganged mode, a logical DEV IM may be two channels wide. Each physical DIMM of a dual-channel logical DIMM may be required to be the same size and use the same timing parameters, with both memory sub-controllers being programmed with the same information. When the memory sub-controllers are operated in 64-bit mode, a logical DIMM is equivalent to a 64-bit physical DIMM, with a corresponding, respective memory sub-controller controlling each channel.

DRAM controller 203 shown in FIG. 2 represents one possible embodiment of DRAM controller 105 shown in FIG. 1, and may include memory sub-controllers 204 and 206, for controlling memory channels 0 and 1, respectively. DRAM controller 203 may be configured to operate memory sub-controllers 204 and 206 in either ganged or unganged mode. In the embodiment shown in FIG. 2, memory sub-controller 206 is configured to support a 64-bit data path, and memory sub-controller 204 is configured to support either a 64-bit data path (in unganged mode) or a 128-bit data path (in ganged mode). Thus, in unganged mode, memory sub-controller 204 may control the 64-bit data path of channel 0, and memory sub-controller 206 may control the 64-bit data path of channel 1. In ganged mode, memory sub-controller 206 may be disabled, and memory sub-controller 204 may be operated in 128-bit mode to control both channels. This, however, requires that the 64-bit data path output of channel 1 be multiplexed according to whether channel 1 is controlled by memory sub-controller 206 (in unganged mode), or controlled by memory sub-controller 204 (in ganged mode). Thus, multiplexer (MUX) 208 may be configured to select between the respective 64-bit data paths using a Gang Mode signal as the control signal. When memory sub-controllers 204 and 206 are operated in ganged mode, MUX 208 may operate to select 64-bit data path 212, whereas when operated in unganged mode, MUX 208 may operate to select 64-bit data path 210.

Figure 3:
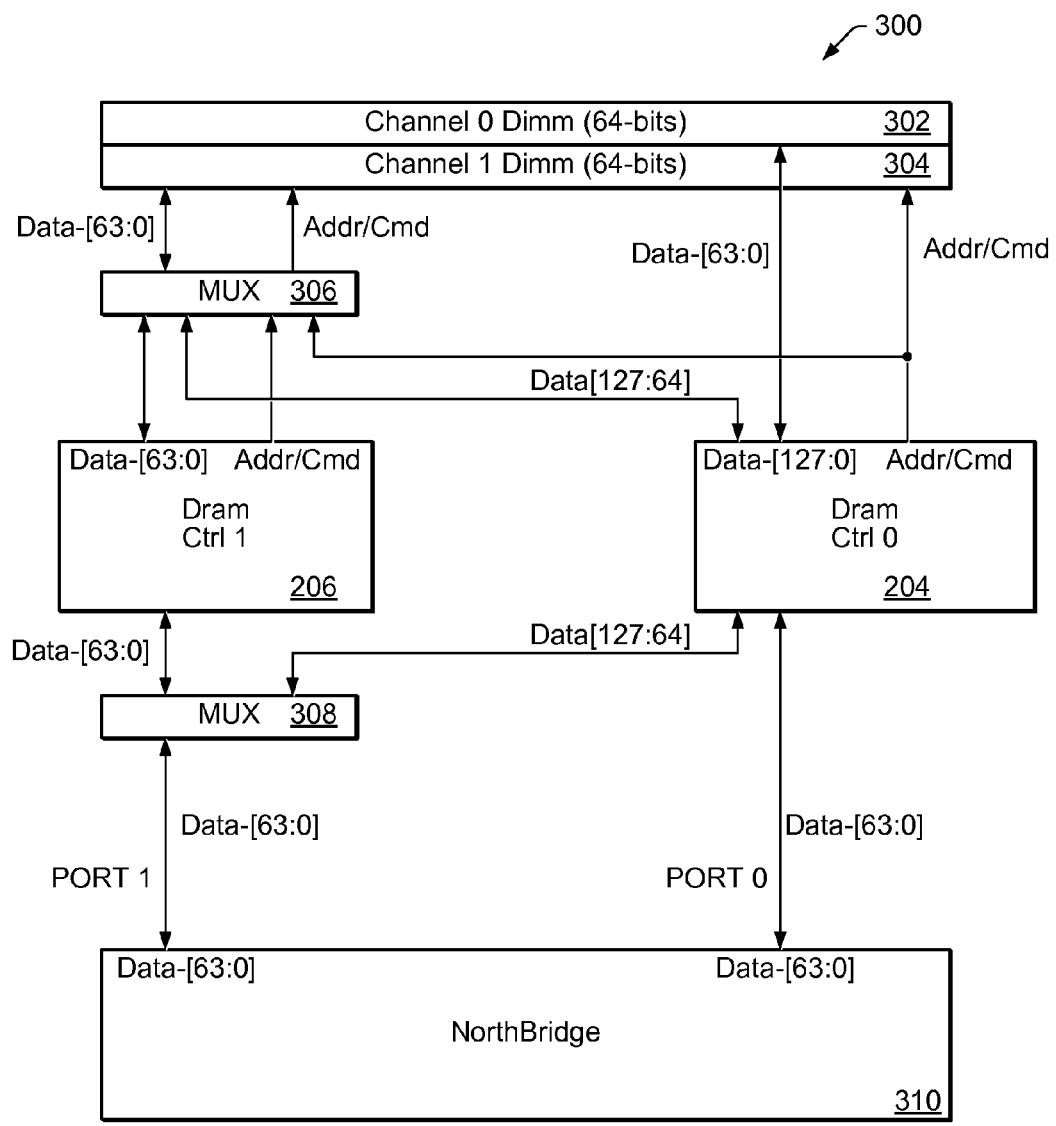
FIG. 3 is a more detailed block diagram showing one embodiment of the memory controller configuration of FIG. 2.

A more detailed illustration of this embodiment is shown in FIG. 3. Memory 105 may comprise physical 64-bit DIMMs 302 and 304. DIMM 302 may be coupled to the data path of DRAM sub-controller 204, and DIMM 304 may be coupled to the output MUX 306. As indicated, North Bridge 310 may be used to provide an interface between, e.g. a central processing unit, and DRAM sub-controllers 204 and 206. In this embodiment, port 0 may be configured (e.g. by software) as a 128-bit controller when operating in ganged mode. Consequently, DRAM sub-controller 204 may be configured with a 128-bit data path, where bits 63:0 may correspond to channel 0 (as mentioned above), and bits 127:64 may correspond to channel 1, when DRAM sub-controller 204 is used in ganged mode. Thus, the 64-bit data path corresponding to channel 1 is also multiplexed between North Bridge 310 and DRAM sub-controllers 204 and 206.

When operating in unganged mode, MUX 308 is used to route the 64-bit data corresponding to channel (port) 1 and received from North Bridge 310 to DRAM sub-controller 206. MUX 306 is then used to select the data from DRAM controller 206 to couple to channel 1 DIMM 304. When operating in ganged mode, MUX 308 is used to route the 64-bit data corresponding to port 1 and received from North Bridge 310 to DRAM sub-controller 204, as bits 127:64 of the 128-bit data path controlled by DRAM sub-controller 204. MUX 306 is then used to select bits 127:64 of the data path from DRAM controller 204 to couple to channel 1 DIMM 304. In addition, MUX 306 may also be used to select the address/command information used for addressing and accessing DIMMs 302 and 304. In unganged mode, MUX 306 may be used to select address and command information from DRAM sub-controller 206, while in ganged mode, MUX 306 may be used to select the address and command information from DRAM sub-controller 204.

While this may provide a solution to give DRAM controller 103 the capability of accessing either two independent 64-bit channels or a single 128-bit channel (in general two independent N-bit channels or a single <2*N>-bit channel), configuring DRAM sub-controller to be truly 128-bit capable by controlling an actual 128-bit data path results in an increased area occupied by DRAM sub-controller 204. In addition, the multiplexing performed by MUX 306 and MUX 308 may present a challenge, since implementing the source sync buses may be highly problematic. Furthermore, a 128-bit interface may require DRAM sub-controller 204 to store a substantial amount of data in configuration registers to identify the DIMM type and memory range of the additional DIMMs for the other 64-bit channel (i.e., for data bits 127:64). As indicated in FIG. 3, such a configuration also requires a complete 128-bit data path between DRAM sub-controller 204 and DIMMs 302 and 304, as well as between DRAM sub-controller 204 and North Bridge 310, which may be difficult to implement in the presence of another controller such as DRAM sub-controller 206, which may be required to operate in unganged mode.

Figure 4:
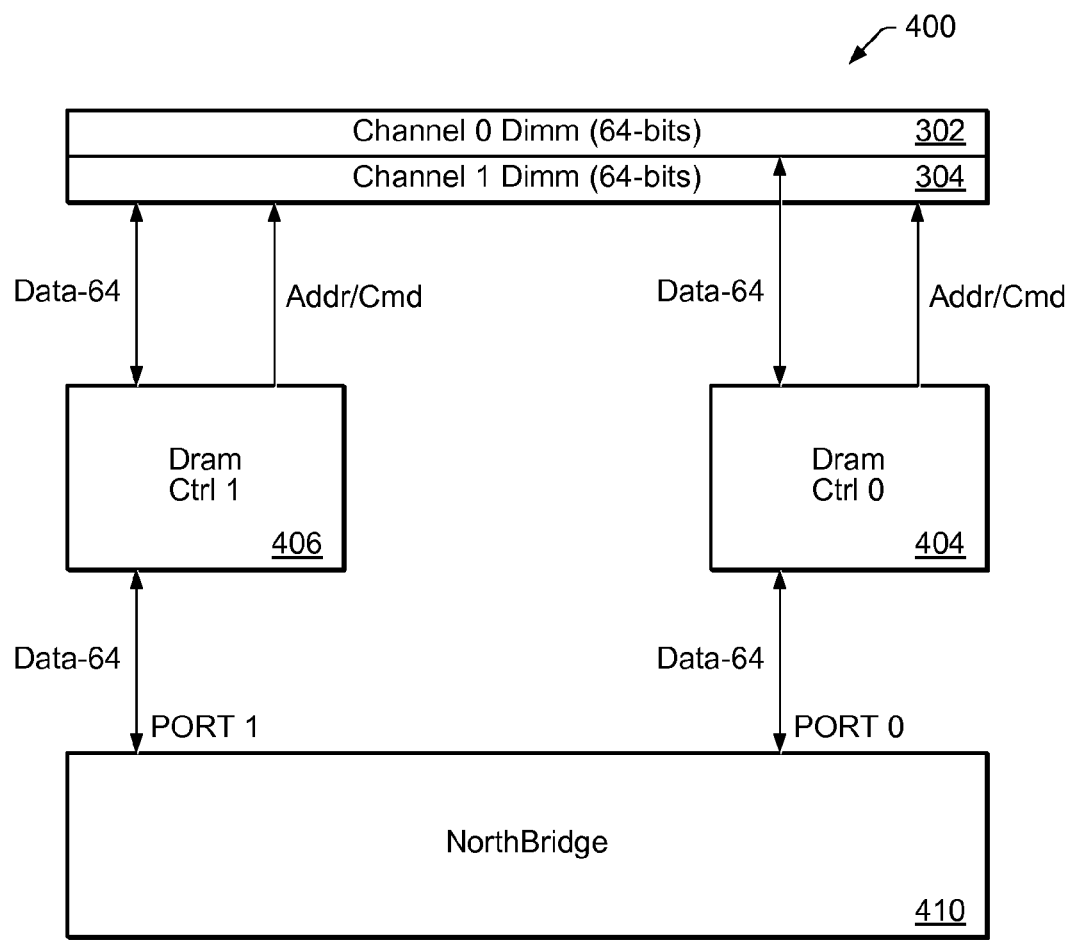
FIG. 4 is a block diagram showing one embodiment of a configuration in which two 64-bit memory controllers are used to provide 128-bit data for a 128-bit logical memory channel.

FIG. 4 shows an alternate embodiment 400, in which DRAM sub-controllers 404 and 406 may both be configured to independently control respective 64-bit data paths, while also configured to control a single 128-bit data path together, and without either sub-controller having to be configured with an actual 128-bit data path (like the configuration shown in FIG. 3). In this embodiment, independent DRAM sub-controllers 404 and 406 may be configured to operate as a single 128-bit wide dual channel DRAM controller in ganged mode, or as two single-channel 64-bit wide DRAM controllers in unganged mode. In general, DRAM sub-controllers 404 and 406 may be configured to operate as a single <2*N>-bit wide dual channel DRAM controller in ganged mode, or as two single-channel N-bit wide DRAM controllers in unganged mode. In ganged mode, both DRAM sub-controller 406 and DRAM sub-controller 404 may be programmed with the same information. Thus, information/data written to a first set of registers, which corresponds to DRAM sub-controller 404, may be applied to both channels (ports). Information/data written to a second set of registers, which corresponds to DRAM sub-controller 406, may be ignored. Read and write operations may be tailored to the size of cache lines that may be used in the system. For example, in one set of embodiments 64-byte cache lines may be used. For a 64-bit interface this would means an 8 beat burst data transfer (or a burst length of 8). On a 128-bit interface this would mean a burst length of 4.

Ganged Mode

When operating in ganged mode in the configuration shown in FIG. 4, DRAM sub-controllers 406 and 404 may each individually operate as if they were controlling the entire 128-bit interface, while each would actually control one half of the 128-bit interface. Thus, even when operating in ganged mode, DRAM sub-controller 406 may access DIMM 304 and DRAM sub-controller 404 may access DIMM 302. Each sub-controller may adjust the number of beats in a burst transfer and may also adjust the address mapping, operating as if it were controlling the full 128-bit bus. Thus, the configuration shown in FIG. 4 may represent an optimal solution as DRAM sub-controller 404 and DRAM sub-controller 406 may be designed and built to be identical, and no multiplexing is required.

Each sub-controller may fundamentally handle an N-bit (e.g. 64-bit) interface. The data path through each controller may be the same, N bits, which in this case is 64-bits. Thus, although each sub-controller only handles a respective 64-bit (N-bit) interface, each sub-controller may be 128-bit ((2*N)-bit) capable with respect to control logic, for controlling a logical 128-bit ((2*N)-bit) data path. In other words, each sub-controller may logically behave as if it were handling data in 128-bit ((2*N)-bit) chunks, that is, transmitting and receiving data 128 bits (2*N bits) at a time. The full bandwidth may be achieved by having one of the sub-controllers, e.g. DRAM sub-controller 404 handle a first 64 bits (N bits) of each of the 128-bit ((2*N)-bit) data chunks, and the other sub-controller, e.g. DRAM sub-controller 406 handle a second "copy" of the commands with a corresponding other 64 bits (N bits) of data (representing the remaining half of each of the full 128-bit ((2*N)-bit) data chunks), where both sub-controllers are operating as if they were handling the entire 128-bit ((2*N)-bit) data path.

In one set of embodiments, during system startup the BIOS may configure and initialize the sub-controllers to operate in ganged mode, if control of a single (2*N)-bit wide channel is desired, and one of the channels corresponding to one of the two sub-controllers (e.g. the channel corresponding to DRAM sub-controller 404) may be specified as the (2*N)-bit wide channel that will be used. Once initialization is complete, the BIOS may simply access the specified channel, with all subsequent configuration accesses to the specified channel (and thus the corresponding sub-controller) "shadowed", or copied to the other sub-controller (with the possible exception of certain specified training registers, which the BIOS may write individually in each sub-controller to ensure that the sub-controllers will work properly with their respective channels). In general, once initialization is complete, the BIOS and (all system) software may no longer need to be aware that the sub-controllers are operating in ganged mode, and only the channel specified as the (2*N)-bit wide channel (e.g. the channel corresponding to DRAM sub-controller 404) may be accessed, with all subsequent accesses to the specified channel copied by North Bridge 410 to the other sub-controller (e.g. DRAM sub-controller 406).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for accessing a memory channel having a (2*N)-bit data path, wherein N is a positive integer, the method comprising:
    transmitting access information to a first memory controller having an N-bit data path, to transmit or receive (2*N)-bit chunks of data through the memory channel;
    copying the access information to a second memory controller having an N-bit data path;
    in response to said transmitting the access information and said copying the access information:
        the first memory controller transmitting or receiving a first N-bit portion of each of the (2*N)-bit chunks of data over its N-bit data path; and
        the second memory controller transmitting or receiving a remaining N-bit portion of each of the (2*N)-bit chunks of data over its N-bit data path.

2. The method of claim 1, further comprising;
    the first memory controller transmitting or receiving the first N-bit portion of each of the (2*N)-bit chunks of data over its N-bit data path to or from a first physical memory having N data lines coupled to the N-bit data path of the first memory controller; and
    the second memory controller transmitting or receiving the remaining N-bit portion of each of the (2*N)-bit chunks of data over its N-bit data path to or from a second physical memory having N data lines coupled to the N-bit data path of the second memory controller.

3. The method of claim 1, further comprising:
prior to said transmitting the access information and said copying the access information, configuring the first memory controller and the second memory controller to operate in ganged mode.

4. The method of claim 3, further comprising executing firmware instructions to initialize a system comprising the first memory controller and the second memory controller;
wherein said executing the firmware instructions comprises said configuring the first memory controller and the second memory controller.

5. The method of claim 1, wherein said transmitting access information to the first memory controller comprises transmitting address information.

6. The method of claim 5, further comprising transmitting to the first memory controller one or more (2*N)-bit chunks of data corresponding to the address information, to store the one or more (2*N)-bit chunks of data according to the address information.

7. The method of claim 5, further comprising replicating the one or more (2*N)-bit chunks of data corresponding to the address information to the second memory controller.

8. The method of claim 7, further comprising:
the first memory controller transmitting a first N-bit portion of each of the one or more (2*N)-bit chunks of data corresponding to the address information over its N-bit data path to a first physical memory having N data lines coupled to the N-bit data path of the first memory controller; and
the second memory controller transmitting a remaining N-bit portion of each of the one or more (2*N)-bit chunks of data corresponding to the address information over its N-bit data path to a second physical memory having N data lines coupled to the N-bit data path of the second memory controller.

9. The method of claim 1, wherein the first memory controller and the second memory controller are identical.

10. A system comprising:
a first memory controller having an N-bit data path, wherein N is a positive interger, and wherein the first memory controller is configured to receive first type access information intended for transmitting and/or receiving corresponding (2*N)-bit chunks of data over a (2*N)-bit memory channel;
a second memory controller having an N-bit data path; and
a control block coupled to the first memory controller and the second memory controller, and configured to replicate the first type access information received by the first memory controller over to the second memory controller;
wherein the first memory controller is configured to transmit or receive a first N-bit portion of each of the (2*N)-bit chunks of data over its N-bit data path according to the received first type access information, and the second memory controller is configured to transmit or receive a remaining N-bit portion of each of the (2*N)-bit chunks of data over its N-bit data path according to the replicated first type access information.

11. The system of claim 10;
wherein the first memory controller and the second memory controller are further configured to each receive respective second type access information intended for transmitting or receiving respective N-bit chunks of data over respective N-bit memory channels;
wherein the first memory controller is configured to transmit or receive its respective N-bit chunks of data over its N-bit data path according to its received respective second type access information, and the second memory controller is configured to transmit or receive its respective N-bit chunks of data over its N-bit data path according to its received second type access information.

12. The system of claim 10, further comprising:
a first memory module having N data lines coupled to the N-bit data path of the first memory controller; and
a second memory module having N data lines coupled to the N-bit data path of the second memory controller;
wherein the first memory controller is configured to transmit or receive a first N-bit portion of each of the (2*N)-bit chunks of data to or from the first memory module over its N-bit data path; and
wherein the second memory controller is configured to transmit or receive a remaining N-bit portion of each of the (2*N)-bit chunks of data to and/or from the second memory module over its N-bit data path.

13. The system of claim 12, wherein the first memory module and the second memory module are of a same type of dynamic random access memory.

14. The system of claim 12, wherein the first memory module and the second memory module are of identical size.

15. The system of claim 12, wherein the first memory module and the second memory module use same timing parameters.

16. The system of claim 10, wherein the first memory controller and the second memory controller are configured to operate as one of:
a single (2*N)-bit wide dual-channel memory controller; or
two N-bit wide single-channel memory controllers.

17. The system of claim 10, wherein the first memory controller and the second memory controller are identical.

18. A system comprising:
a memory bus;
a first memory module and a second memory module each coupled to the memory bus and each having respective N data lines, wherein N is a positive integer;
a first memory controller having an N-bit data path coupled to the memory bus, wherein the first memory controller is configured to receive first type access information intended for transmitting or receiving corresponding (2*N)-bit chunks of data over a (2*N)-bit memory channel;
a second memory controller having an N-bit data path coupled to the memory bus; and
a control block coupled to the first memory controller and the second memory controller, and configured to replicate the first type access information received by the first memory controller over to the second memory controller;
wherein the first memory controller is configured to transmit or receive a first N-bit portion of each of the (2*N)-bit chunks of data to or from the first memory module via the memory bus over its N-bit data path according to the received first type access information, and the second memory controller is configured to transmit or receive a remaining N-bit portion of each of the (2*N)-bit chunks of data to or from the second memory module via the memory bus over its N-bit data path according to the replicated first type access information.

19. The system of claim 18, further comprising a central processing unit (CPU) coupled to the control block, wherein the CPU is configured to transmit the first type access information for transmitting or receiving the corresponding (2*N)-bit chunks of data over a (2*N)-bit memory channel.

20. The system of claim 18, wherein the first memory module and the second memory module are DDR DRAM memory modules, and the first memory controller and the second memory controller are DDR DRAM memory controllers.

21. A method for accessing a data channel having a (2*N)-bit data path, wherein N is a positive integer, the method comprising:
  transmitting access information to a first controller having an N-bit data path, to transmit and/or receive (2*N)-bit chunks of data through the data channel;
  copying the access information to a second controller having an N-bit data path;
  in response to said transmitting the access information and said copying the access information:
    the first controller transmitting or receiving a first N-bit portion of each of the (2*N)-bit chunks of data over its N-bit data path; and
    the second controller transmitting or receiving a remaining N-bit portion of each of the (2*N)-bit chunks of data over its N-bit data path.

* * * * *